United States Patent Office 3,496,120
Patented Feb. 17, 1970

3,496,120
HALOGEN CONTAINING POLYETHER EPOXIDE COMPOSITION OF MATTER AND PROCESS OF PREPARING SAME
Pauls Davis, Gibraltar, and Herwart C. Vogt, Grosse Ile, Mich., assignors to Wyandotte Chemicals Corporation, Wyandotte, Mich., a corporation of Michigan
No Drawing. Filed June 27, 1966, Ser. No. 560,905
Int. Cl. C08g 30/02
U.S. Cl. 260—2   16 Claims

ABSTRACT OF THE DISCLOSURE

A halogen-containing polyether epoxide composition of matter and process for preparing same wherein the composition is a mixture of ethers of aliphatic polyhydric alcohols which polyhydric alcohols have from 3 to 6 hydroxyl groups with at least 2 of the hydroxyl groups replaced in part by the group:

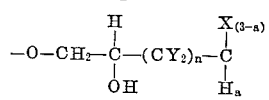

wherein $n$ is an integer of from 0 to 1, $a$ is an integer of from 0 to 1, X is halogen and Y is H or halogen and in part by the group:

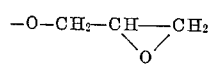

and any hydroxyl groups which are not so replaced being unchanged hydroxyl groups.

---

This invention relates to halogenous compositions and, more particularly, to a new and novel class of halogen-containing ether epoxides which are particularly useful in the preparation of more complex epoxide-based compositions which have a relatively high order of nonflammability and which, in many cases, are nonburning as well as self-extinguishing.

As used herein, the term "epoxide" denotes a compound characterized by the presence of at least one cyclic ether group, namely, one wherein an ether oxygen atom is attached to two adjacent carbon atoms thereby forming a cyclic structure. The terms "epoxy" and "oxirane ring" also describe the foregoing cyclic ether group.

The commercial potentialities of epoxy-containing resins and related polymeric materials are well recognized by those skilled in the art. The properties of such compositions have made them successful competitors in many applications with other more conventional materials. However, in spite of the excellent physical and chemical properties of such epoxide-based compositions, it has also been found that they possess a major disadvantage and, consequently, a factor which limits the area of their potential use: they are flammable and burn readily.

Accordingly, it is a purpose of this invention to provide a new and useful class of epoxy-containing materials which are thermally stable and may be prepared from commercially available materials which are relatively inexpensive and which are useful as intermediates in the preparation of polymeric compositions which have a relatively high order of nonflammability which, in many cases, are nonburning and which compositions may be cross-linked.

It has now been found that the foregoing and additional purposes are accomplished by reacting (1) a polyhydric alcohol having 3 to 6 hydroxyl groups and at least 3 carbon atoms with
(2) alkylene oxide containing from 3 to 4 carbon atoms and having attached to a carbon atom of the oxirane ring an alkyl group having up to 2 carbon atoms and containing at least two, and preferably 3, halogen atoms attached to a terminal carbon atom and where the alkyl group contains 2 carbon atoms the second carbon atom may also contain a halogen substituent and
(3) an epihalohydrin.

This produces a halogenated ether characterized by at least 3 noncyclic ether-linked carbon chain branches, at least 3 halogen atoms, a terminal carbon atom of at least one branch having at least 2 halogen atoms attached thereto, and a terminal carbon atom of at least one of the remaining branches having only one halogen atom attached thereto. An epoxide group is then formed from at least one of said branches terminated by a carbon atom having only one halogen atom by dehydrohalogenation. Dehydrohalogenation, as the expression is used herein, is a process wherein a hydrogen halide is removed to accomplish ring closure and produce an epoxide group. This is preferably performed in the presence of an alkaline material, thereby providing the desired halogen-containing ether epoxide.

The alcohol (1), alkylene oxide (2), and epihalohydrin (3) may be all mixed together at once but it is preferred to, first, react the alcohol (1) with the alkylene oxide (2), followed by reaction of the product of this reaction with the epihalohydrin (3), preferably in the presence of a suitable catalyst, followed by dehydrohalogenation. While a catalyst is not essential for the reaction of the alcohol (1) with alkylene oxide (2), a catalyst may be used in this step with beneficial results.

In a preferred practice of this invention the dehydrohalogenation treatment is effected in the presence of an organic solvent. Organic solvents or diluents which may be used, and which are substantially unreactive in this treatment, include: hydrocarbons such as benzene, toluene, etc.; ketones such as acetone, methyl ethyl ketone, etc.; ethers typified by diethyl ether, methylal, dichloroethyl ether (Chlorex), 1,3-dioxolane and dioxane; halides such as ethylene dichloride, carbon tetrachloride, etc.

In the formation of the epoxy compounds of the present invention, it is possible to vary the proportions of the alcohol (1), alkylene oxide (2), and epihalohydrin (3) over a considerable range and the products so formed are of somewhat varied character. Accordingly, the preferred properties in an individual case depend on a number of factors, including intended use of the epoxy compound, properties desired in both the epoxy compound itself and in compositions based on it, the exact reactants employed, etc. Where the alcohol (1) and alkylene oxide (2) are reacted in a 1:1 molar ratio or where the amount of alcohol is in excess of a 1:1 molar ratio, the alkylene oxide reacts with only one of the hydroxyl groups of the alcohol, leaving the remaining hydroxyl groups free for further reaction. Where the alcohol is reacted with the alkylene oxide in a 1:2 molar ratio, two of the hydroxyls of the alcohol are reacted with the alkylene oxide, thus reducing by one the number of hydroxyls available for further reaction.

The epihalohydrin in the second step reacts preferentially with hydroxyls of the alcohol that did not react with alkylene oxide forming ether chains terminated by a carbon atom having a single halogen atom attached thereto in place of the hydroxyl groups of the alcohol. Accordingly, it is preferred to employ a ratio of moles of epihalohydrin to remaining hydroxyl groups of the alcohol of 1:1. Greater amounts of epihalohydrin may be employed with little or no difference in the reaction product. If lesser amounts of epihalohydrin are employed, a compound is produced which retains some of the original hydroxyl groups.

Dehydrohalogenation preferentially affects the ether chain or chains terminated by a carbon atom having a single halogen atom, leaving the ether chain or chains terminated by a carbon atom having more than one halogen atom unaffected.

Thus, the product of this invention is a halogen-containing polyether-polyepoxide composition of matter, which composition of matter is a mixture of ethers of aliphatic polyhydric alcohols which aliphatic alcohols have from 3 to 6 hydroxyl groups with at least 2 of the hydroxyl groups replaced in part by the group:

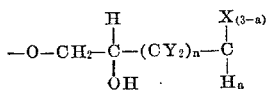

wherein $n$ is 0 or 1, $a$ is 0 or 1, X is halogen, and Y is H or halogen and in part by the group:

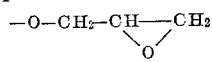

and any hydroxyl groups wich are not so replaced, being unchanged hydroxyl groups.

Thus, the process of this invention may, in general, be depicted by the following equation:

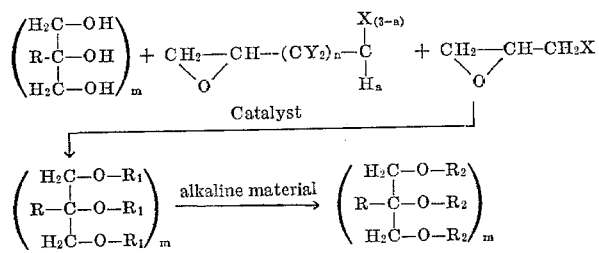

wherein R is hydrogen or a hydrocarbon residue, $R_1$ is a radical selected from the group consisting of

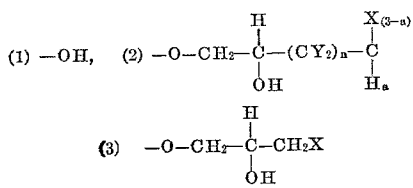

at least one $R_1$ being redical (2) above and at least one $R_1$ being radical (3) above, $R_2$ is a radical selected from the group consisting of

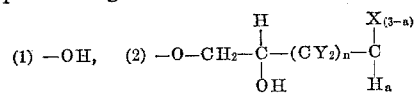

and

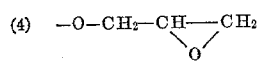

at least one $R_2$ being radical (2) above and at least one $R_2$ being radical (4) above, X is halogen, Y is H or halogen, $m$ is an integer of from 1 to 4, $n$ is an integer of from 0 to 1, and $a$ is an integer of from 0 to 1.

Catalysts which may be used in the reaction of the alcohol (1) with the alkylene oxide (2) and also the reaction of the adduct with epihalohydrin (3) are typically those of the Friedel-Crafts type, including anhydrous $AlCl_3$, $BF_3$, $ZnCl_2$, $FeCl_3$, $SnCl_4$, and complexes such as well-known $BF_3$ etherates, etc.; acid type catalysts, including HF, $H_2SO_4$, $H_3PO_4$, etc.; basic type catalysts, such as NaOH, KOH, sodium acetate, etc.; and others such as $SbCl_5$. Since boron trifluoride is a gas at the normal reaction temperatures employed, it is desirable to add the boron trifluoride in the form of a compound or complex of boron trifluoride which is liquid at the reaction temperature. Accordingly, the term "boron trifluoride" as used herein includes boron trifluoride and compounds and complexes of boron trifluoride which facilitate the use of boron trifluoride in the reaction. Ether compounds and complexes of boron trifluoride are preferred. These materials are disclosed and discussed in Boron Trifluoride and Its Derivatives by Harold Simmons Booth and Donald Ray Martin, pages 68–71, John Wiley and Sons, Inc., New York, 1949. In general, compounds and complexes of the lower ethers are preferred since these provide higher percentages of $BF_3$ in the compound or complex. Particularly preferred are the boron trifluoride compounds or complexes of dimethyl ether, diethyl ether, methyl ethyl ether and tetrahydrofuran. A suitable product which is readily available is the well-known commercial product known as boron trifluoride etherate which is primarily the boron trifluoride complex of diethyl ether.

Concentration of catalyst may be varied depending upon the individual catalyst. In the reaction of the alcohol with the halogenated epoxide, a catalyst is not essential and the amount of catalyst when employed may range up to 5% by weight of the total reactants. For the reaction with the epihalohydrin from about 0.001 to 5% by weight of catalyst based on the total quantity of reactants provides satisfactory results. In general, the concentration of catalyst is less than 1% by weight of the total reactants, particularly when $BF_3$ type catalysts are employed. With certain of the less active catalysts, i.e., $SbCl_5$, etc., larger amounts may be used to advantage.

Numerous alkaline materials are known for dehydrohalogenation to produce epoxides and all such materials, and procedures for using the same, are contemplated herein. For example, aqueous and anhydrous sodium potassium or lithium hydroxide may be used. A large number of basic reacting metal salts of strong bases and weak acids are known as dehydrohalogenating agents. Illustrative of such alkaline materials are: sodium and potassium carbonates and bicarbonates; borax; hydroxides of magnesium, zinc, lead, iron and aluminum, and the corresponding oxides; etc.

The quantity of alkaline material used for the dehydrohalogenation or ring closure may be varied depending on the individual material. Satisfactory results are ordinarily obtained with an OH/chlorohydrin (Cl$^-$) mole ratio from 0.5 to 2.

Polyhydric alcohols containing at least 3 carbon atoms and 3 to 6 hydroxyl groups which may be used for reacting with the aforesaid halogenated epoxides are illustrated by glycerol, erythritol, sorbitol, mannitol, inositol, trimethylolpropane, pentaerythritol, dipentaerythritol, tripentaerythritol, etc.

Alkylene oxides having 3 to 4 carbon atoms and at least 2 halogen atoms which may be employed include 3,3,3-trichloropropylene oxide, 3,3,3-tribromopropylene oxide, 4,4,4-trichlorobutylene-1 oxide, 4,4,4-tribromobutylene-1 oxide, 3,3-dichloropropylene oxide, 4,4-dichlorobutylene-1 oxide, 4,4-dibromobutylene-1 oxide, and 3,3-dibromopropylene oxide and oxides of mixed halides, such as 3-bromo-3,3-dichloropropylene and 4-bromo-4,4-dichlorobutylene oxides.

The epihalohydrins used for reaction with halogenated epoxide alcohol adducts include epichlorohydrin, epibromohydrin, and epiiodohydrin and are preferably in alpha form. The latter materials are all characterized by 3 carbon chains; however, analogs of the aforesaid epihalohydrins may also be used. Examples of the latter are beta- and gamma-methyl epichlorohydrins, 1,4-dichloro-2,3-epoxybutane; etc. Accordingly, the term "epihalohydrin," as used in connection with the preparation of complex halohydrins throughout the specification and appended claims, defines compounds in which the halogen is chlorine and bromine preferably and which may also include iodine. Fluorine is generally not employed. In view of its availability and relatively low cost, epichlorohydrin is preferred.

The first stage of the reaction, i.e., the reaction of the alcohol with the halogenated epoxide proceeds smoothly at a temperature of from about −10° to 200° C. The second step, i.e., reaction of the adduct with the epihalohydrin is preferably performed at a temperature of from about −10° C. to 200° C. while the third step, i.e., reaction with the alkaline material for dehydrohalogenation of the chlorohydrin groupings is preferably carried out at a temperature of −10° C. to +50° C. All the reactions may be performed at atmospheric pressure.

The time necessary to react the alcohol (1), alkylene oxide (2), and epihalohydrin (3) when a one-shot process is used can vary between 1 minute and 2 hours depending on the catalyst or catalysts employed and proportions involved. Where the reactions are carried out as a series of steps, the time for the reaction of the alcohol with the alkylene oxide generally varies from 1 minute to 3 hours or more and the time for the reaction of this product with the epihalohydrin varies from 1 minute to 3 hours or more. In either event the dehydrohalogenation generally requires a period of from 30 minutes to 6 hours for completion.

When they contain a plurality of epoxide groups, the products of this invention can be cross-linked by using compounds capable of reacting with an oxirane group to give hard plastics which have physical properties comparable or superior to those of commercially available epoxy plastics, superior chemical stability as compared with many commercial epoxy plastics, and which are often nonburning.

A variety of curing systems are available to crosslink an epoxy resin. As a generalization, any compound capable of reacting with an oxirane group could be employed as a hardening or curing agent. However, the time of cure, exotherms, toxicity, degree of crosslink, color, tensile strength, heat distortion, hardness, etc., all depend, to some degree, on the catalyst or hardening system employed. Thus, the curing agent is indicative of the product properties, as is the degree of crosslinking and the chemical structure of the epoxy-containing resin. Curing of an epoxy resin can thus be achieved by:

(1) Polymerization through epoxy groups.—The epoxy group may be readily opened by available ions and active hydrogen compounds. $BF_3$, $BF_3$ complexes, strong acids and bases all may initiate this reaction.

(2) Polymerization through hydroxyl groups.—The epoxy groups will react (a) with hydroxyl groups introduced into the resin by the curing agent or modifiers, (b) with hydroxyl groups present in the resin chain of higher weight molecules, (c) with hydroxyl groups formed as an epoxy group opened by an active hydrogen during cure, and (d) with various phenolic hydroxyls, etc.

(3) Curing by crosslinking agents.—Epoxies may be cured by using a reactive intermediate to join the polymer chains. Curing agents which have found commercial acceptance are: amines, hydroxy aliphatic amines, acrylonitrile-amine adducts, aromatic amines, hydroxy aliphatic primary-tertiary diamines, piperidine, phenolic amines, dicyandiamide, and acid anhydrides. Flexibilizing modifiers, such as liquid polysulfide rubbers or polyamides, are also used.

The compounds of the present invention are soluble in most organic polar and non-polar solvents with the notable exception, in most cases, of diethylether and water as well as in many monomers including styrene, butyl methacrylate, triallylisocyanurate, diallylphthalate, etc. These compounds have been found to be compartible in nearly any ratio with standard epoxy resins. Because of these solubilities, it is frequently convenient to mix these compounds with further reactants and/or standard epoxide resins with which they are to be reacted or co-reacted, as in the case of epoxide compounds which are to be cross-linked, and store the resulting mixtures until needed for use.

The molecular weights of the products produced according to the present invention range from about 160 but depending, of course, on the individual reactants to more than 1000.

The products produced in accordance with the present invention may be beneficially used for a variety of purposes, including most applications where commercial epoxide resins are currently being used, but giving products with superior fire and chemical resistance. They range from liquids to rubber elastomers to hard, strong plastics. These products can be used for a variety of purposes in such diversified fields as adhesives, coatings, and the like. These compounds can be cross-linked with various cross-linking agents to yield materials useful in a wide variety of applications including flexible and rigid coatings, elastomers, rubbers, soft-to-hard plastics, etc., all having a high degree of nonflammability and chemical resistance and, in many cases, even being nonburning. The physical properties of these materials may be upgraded by the addition according to well-known procedures of some axiliary natural or synthetic material such as glass fibers, asbestos, sisal, cotton, polyamide and polyester fibers, wood and pigment fillers, etc., to give reinforced plastics and laminates of superior strength and a high degree of non-flammability.

Additional uses and modifications of the stated uses will be readily apparent to one skilled in the art.

The practice of this invention will be more completely understood by reference to the following examples:

EXAMPLE I

In a three-liter, three-neck round-bottom glass reaction flask equipped with a thermometer, stirrer, and condenser, 1640 grams (10 moles) of 3,3,3-trichloropropylene oxide and 1840 grams (20 moles) of glycerol are charged and the mixture heated to reflux, approximately 154° C. At this temperature the cloudy solution becomes clear, the temperature rises to 184° C. at which temperature refluxing ceases and the reaction is completed. The mixture is then cooled to 170° C. and excess unreacted glycerol is removed by vacuum stripping at 1 mm. of mercury. The product is a light ruby-colored liquid weighing 2503 grams (99% yield) containing 6% by weight of the di-3,3,3-trichloropropylene oxide/glycerol adduct. This product is soluble in water and ethyl acetate and contains 41.7% by weight chlorine and 20.5% by weight hydroxyl groups.

A portion of the above product, 1221 grams (4.8 moles), is placed in a three-liter, three-neck round-bottom flask equipped with a condenser, stirrer, and a temperature recording device and 970 grams (10.5 moles, 10% excess) epichlorohydrin added along with 10.4 grams (0.4 mole) tin tetrachloride catalyst. The epichlorohydrin is added in increments of 100 milliliters at 120° C., the epichlorohydrin refluxing temperature. The reaction is carried out for approximately 2 hours, the reaction being self-sustaining. At completion of the reaction, the mixture is heated for 45 minutes at 140° C. to insure complete reaction.

The reaction mixture is then cooled to +5° C. and one liter of benzene as a diluent added before 1664 grams of 25% aqueous sodium hydroxide solution is added incremently. This is then stirred for 2 hours at +5° C. and washed with one liter of water to remove salts. The benzene layer is then dried with magnesium sulfate, filtered, and stripped. 1506 grams (83% yield) of a light straw-yellow oil is obtained. The product contains 5.27% oxirane oxygen, 31.6% chlorine, and has a molecular weight of 445.

EXAMPLE II

A product is prepared by the process of Example I with the exception that epibromohydrin is employed in lieu of epichlorohydrin.

The product is a dark yellow oil which contains 5.2% oxirane oxygen, 30.1% chlorine, and has a molecular weight of 440.

EXAMPLE III

A product is prepared by the process of Example I with the exception that potassium hydroxide is employed in lieu of sodium hydroxide in the final step of the process. The product is substantially the same as that of Example I.

EXAMPLE IV

A product is prepared by the process of Example I with the exception that calcium hydroxide is employed in lieu of sodium hydroxide in the final step of the process. The product is substantially the same as that of Example I.

EXAMPLE V

A product is prepared by the process of Example I with the exception that barium hydroxide is employed in lieu of sodium hydroxide in the final step of the process. The product is substantially the same as that of Example I.

EXAMPLE VI

In a three-liter, three-neck round-bottom glass reaction flask equipped with a thermometer, stirrer, and condenser, 2254 grams (14 moles) of 3,3,3-trichloropropylene oxide and 644 grams (7 moles) of glycerol are charged and the mixture heated to reflux, approximately 154° C. At this temperature the cloudy solution becomes clear and the reactants are heated further to 186° C. at which temperature refluxing ceases and the reaction is completed. Excess unreacted glycerol is then removed by vacuum stripping at 1 mm. of mercury. The product is a light ruby-colored liquid weighing 2269 grams containing 95% by weight of the di 3,3,3-trichloropropylene oxide/glycerol adduct, balance mono 3,3,3-trichloropropylene oxide/glycerol adduct. This product is insoluble in water but soluble in benzene and contains 50.8% by weight chlorine, 13.6% by weight hydroxyl groups, and has a molecular weight of 425 by the ebulliometric technique.

A portion of the above product, 414 grams (1 mole), is placed in a three-liter, three-neck round-bottom flask equipped with a condenser, stirrer, and a temperature recording device, and 102 grams (1.1 moles, 10% excess) epichlorohydrin added along with 2.6 grams (0.01 mole) tin tetrachloride catalyst. The epichlorohydrin is added in increments of 25 milliliters at 120° C., the epichlorohydrin refluxing temperature. The reaction is carried out for approximately 2 hours, the reaction being self-sustaining. At completion of the reaction, the mixture is heated for 15 minutes at 120° C. to insure complete reaction.

The reaction mixture is then cooled to +5° C. and one liter of benzene as a diluent added before 160 grams of a 25% aqueous sodium hydroxide solution is added incrementally. This is then stirred for 2 hours at 5° C. and washed with one liter of water to remove salts. The benzene layer is then dried with magnesium sulfate, filtered, and stripped. 450 grams (96% yield) of a light straw-yellow oil is obtained. The product contains 3.3% oxirane oxygen, 45.5% chlorine, and has a molecular weight of 466.

EXAMPLE VII

In a two-liter pot equipped with a thermometer, stirrer, and condenser, 218 grams (1.24 moles) of 4,4,4-trichlorobutylene-1 oxide and 114 grams (1.24 moles) of glycerol are charged and the mixture heated to 68° C. and 1 milliliter of boron trifluoride etherate (0.008 mole) added. The temperature rises to 190° C. and the mixture is then cooled to 60° C. The product is a straw-colored liquid containing 44.5% by weight chlorine and having a hydroxyl number of 536.

252 grams (2.728 moles, 10% excess) epichlorohydrin are then added to the reaction mixture along with 1.125 grams (0.008 mole) boron trifluoride etherate catalyst. The epichlorohydrin is added first in an amount of 10 milliliters at 60° C., with the balance added dropwise. The reaction is carried out for approximately 2 hours, the reaction being maintained at 80° C. by cooling.

300 milliliters of methylene chloride are added and the reaction mixture cooled to 5° C. and maintained at that temperature while adding 437 grams (2.73 moles) of a 25% aqueous sodium hydroxide solution over a period of one-half hour. This mixture is stirred for 2 hours at 5° C., separated and washed with brine, 200 milliliters for each part, using a separating funnel completely immersed in ice water. The heavier organic part is stirred with 100 grams of magnesium sulfate, filtered at below 100° C. and 1 mm. of mercury. 459 grams 97.5% by weight yield) of a viscous residue is obtained. The product contains 5.12% oxirane oxygen, 32.6% chlorine, and has a hydroxyl number of 203.

EXAMPLE VIII

In a 40 x 5 centimeter tube, 41 grams (0.2 mole) of 3-bromo-3,3-dichloropropylene oxide and 18 grams (0.2 mole) of glycerol are heated together to a temperature of 175° C. The unreacted monomers are then removed by vacuum stripping at 1 mm. of mercury and 150° C.

A portion of the above product, 35 grams (0.12 mole), is placed in a 40 x 5 centimeter tube and 24 grams (0.26 mole) epichlorohydrin added along with two drops tin tetrachloride catalyst and the mixture heated with refluxing. Refluxing slowly ceases and the temperature climbs to 170° C.

The reaction mixture is dissolved in 50 milliliters of benzene and cooled to water-ice temperature. 9.6 grams (0.24 mole) sodium hydroxide in 50 milliliters of water solution is added and the mixture stirred for 1 hour. The benzene layer is separated, washed twice with water, separted, dried with magnesium sulfate, filtered, and stripped. 39 grams (80% yield) of a tan oil with a 5.3% oxirane oxygen content is obtained.

EXAMPLE IX

In a three-liter, three-neck round-bottom glass reaction flask equipped with a thermometer, stirrer, and condenser, 1270 grams (10 moles) of 3,3-dichloropropylene oxide and 1104 grams (12 moles) of glycerol are charged and the mixture slowly heated to 148° C. at which temperature refluxing is observed. The cloudy reaction mixture becomes clear after about 15 minutes at this temperature. This temperature is maintained for a total of 45 minutes before being increased to 175° C. for 30 minutes. No further refluxing is observed and excess glycerol is removed by vacuum stripping at this temperature and 1 millimeter of mercury pressure. The product is straw-colored, weighs 2180 grams and is soluble in ethyl acetate and water and insoluble in methanol. The product contains 32% by weight chlorine, 22.8% by weight hydroxyl groups and has a molecular weight of 217 by ebullioscopic measurement.

A portion of the above product, 1095 grams (5 moles), is placed in a three-liter, three-neck round-bottom flask equipped with a condenser, stirrer, and temperature indicating device. 10 grams of tin tetrachloride are added and the mixture heated to 100° C. before 90 milliliters of epichlorohydrin are added. The temperature climbs slowly to 120° C. After refluxing ceases, additional epichlorohydrin is added up to a total of 934 grams (10. 1 moles) epichlorohydrin which is added in 5 increments during the course of 2 hours. At the completion of the addition, the temperature is increased to 178 C. to insure completion of reaction.

The reaction mixture is then cooled, dissolved in one liter of benzene to which is added in three increments 404 grams of sodium hydroxide which is dissolved in one liter of water. This is then stirred for 2½ hours with the temperature maintained between +5 and 12° C. The benzene layer is separated, an additional one liter of benzene added, the organic layer then washed twice with water and once with a saturated salt solution before being separated and dried over magnesium sulfate. After removing the drying agent, benzene is removed by vacuum distillation at 1 millimeter of mercury and 100° C. 1418 grams (85% yield) of light straw-yellow, slightly viscous oil is obtained. The product contains 8.2% oxirane oxygen, 20.1% chlorine and has a molecular weight of 361 by ebullioscopic measurement.

EXAMPLE X

In a 30 x 2 centimeter sealed glass tube, 12.0 grams (0.1 mole) 3,3,3-trifluoropropylene oxide, 9.2 grams (0.1 mole) glycerol and a trace of boron trifluoride gas as a catalyst, all dissolved in 20 grams of ethyl acetate solvent are heated in a steam bath for 15 hours. After cooling, the tube is opened and the solvent stripped to yield 18 grams of a free-flowing oil. This product is mixed with 19 grams (0.2 mole) of epichlorohydrin and heated to about 90° C. on a steam bath before a drop of tin tetrachloride catalyst is added. Heating is continued using a hot air gun and the temperature allowed to climb to 150° C. to insure completion of reaction. Unreacted epichlorohydrin is then removed by vacuum distillation at 1 millimeter of mercury and 150° C. to yield 25 grams of an oil. This oil is dissolved in 100 milliliters of benzene and cooled to about 8° C. and then reacted with 4 grams of sodium hydroxide which is dissolved in 25 milliliters of water. The mixture is vigorously stirred for 60 minutes, the benzene layer decanted, washed twice with water, dried over magnesium sulfate, filtered, and stripped to yield a free-flowing oil with 7.8% oxirane oxygen.

EXAMPLE XI

In a reaction flask, 181 grams (1.12 moles of 3,3,3-trichloropropylene oxide and 150 grams (1.12 moles) of trimethylolpropane are heated to 80–90° C. until solution is complete. 0.2 milliliter of tin tetracloride is then added to this solution at 55° C. and the solution heated slowly to 180° C. when an exotherm raises the temperature to 195° C. The mixture is then cooled rapidly whereby the reaction is maintained at 177° C. for 15 minutes producing 331 grams of a product having a specific gravity of 1.338, a hydroxyl number of 470 and containing 34.8% chlorine.

A portion of the above product, 197 grams (0.667 mole), is placed in a three-neck flask connected with a stirrer, thermometer, and condenser and 0.8 milliliter (1.76 grams, 0.00676 mole) of tin tetrachloride catalyst added and heated to 120° C. 136 grams (1.47 moles, 10% excess) of epichlorohydrin are added in small portions and the mixture stirred an extra 45 minutes at 140° C. The reaction mixture is then cooled and 200 milliliters of methylene chloride added, followed by cooling to +5° C. At this point 235 grams (1.47 moles) of a 25% aqueous sodium hydroxide solution is added over a period of about ½ hour with efficient stirring. After an additional 2 hours at 5° C., the reaction mixture is separated while standing overnight immersed in ice water and then washed twice with water. The methylene chloride solution of the product is dried with magnesium sulfate, filtered, and stripped at 95° C. and 1 millimeter of mercury pressure for 45 minutes. 178 grams of a yellow, viscous syrup which is soluble in methanol is obtained.

EXAMPLE XII

In a reaction flask, 176 grams (1.09 moles) of 3,3,3-trichloropropylene oxide and 74.2 grams (0.545 mole) of pentaerythritol are heated together. At 140° C., 0.25 milliliter of tin tetrachloride is added with continued heating after which a mild exotherm raises the temperature to 170° C. which is the reflux temperature whereupon the exotherm becomes stronger and increases the temperature to 180° C. The temperature is maintained at 180° C. for 5 minutes producing a product which is a solid containing 44.2% chlorine having a hydroxyl number of 499.

The reaction mixture is then cooled to 120° C. 0.8 milliliter of tin tetrachloride and 111 grams (1.2 moles) of epichlorohydrin are intermittently added in small portions over a period of ½ hour. The temperature is then raised to and maintained at 140° C. for an additional 2 hours. 361 grams of reaction mixture are obtained which is dissolved in 370 milliliters of methylene chloride and the solution cooled to 5° C. 192 grams (1.2 moles) of a 25% aqueous sodium hydroxide solution are added with efficient stirring for ½ hour. The mixture is maintained at 5° C. for an extra 2 hours. The reaction mixture separates after standing overnight at 0° C., the lower organic portion is dried with magnesium sulfate, filtered and stripped at 95° C. and 1 millimeter mercury pressure. 248 grams of a brown, barely flowing, syrup which is soluble in methanol is obtained. This product contains 1.95% by weight of oxirane oxygen, 39.4% by weight of chlorine, and has a hydroxyl number of 263.

EXAMPLE XIII

In a reaction flask, 367 grams (2.275 moles) of 3,3,3-trichloropropylene oxide, 138 grams (0.758 mole) of stripped sorbitol, and 1 milliliter of boron trifluoride etherate are heated to reflux at 167° C. Another 1 milliliter of catalyst is added and the mixture heated to 173° C. The mixture is then cooled to 100° C. and 250 millilitres of methylene chloride slowly added. The methylene chloride solution is washed twice with brine, dried with magnesium sulfate, filtered, and stripped. The product is a light-brown glass having a hydroxyl number of 438 and containing 44.7% of chlorine.

A portion of the above product, 314 grams (0.459 mole), is placed in a reaction flask and 1.24 grams of tin tetrachloride added. 140 grams (1.513 moles) of epichlorohydrin are then added in small portions at 120° C. over a period of 15 minutes. The temperature is then raised to and maintained at 140° C. for 2 hours, followed by cooling. 300 milliliters of methylene chloride are then added with the temperature at 5° C. 242 grams (1.513 moles) of an aqueous sodium hydroxide solution are then added with stirring over a period of 35 minutes, the viscosity of the reaction mixture increasing during the addition of the sodium hydroxide. Separation then takes place by standing overnight at room temperature. The organic phase is dried with magnesium sulfate, filtered, and stripped at 95° C. and 1 millimeter of mercury for 45 minutes. A dark, glassy product is produced which has a hydroxyl number of 369, contains 40.4% by weight of chlorine and 0.72% by weight of oxirane oxygen.

It is to be understood that various changes and modifications may be made in the foregoing composition and process without departing from the spirit of the invention and scope of the appended claims.

What is claimed is:

1. A halogen-containing polyether epoxide composition of matter, said composition being a mixture of ethers of aliphatic polyhydric alcohols which polyhydric alcohols have from 3 to 6 hydroxyl groups with at least 2 of the hydroxyl groups replaced in part by the group:

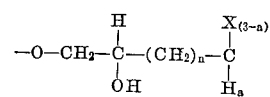

wherein $n$ is an integer of from 0 to 1, $a$ is an integer of from 0 to 1, and X is halogen and in part by the group:

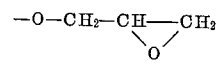

and any hydroxyl groups which are not so replaced being unchanged hydroxyl groups.

2. A composition as defined in claim 1 in which X is chlorine.

3. A composition as defined in claim 1 in which $n$ is 0.

4. A composition as defined in claim 1 in which said polyhydric alcohol is glycerol.

5. A composition as defined in claim 1 in which $n$ is 1.

6. A composition in accordance with claim 1 in which said polyhydric alcohol is trimethylolpropane.

7. A composition as defined in claim 1 in which said alcohol is pentaerythritol.

8. A composition in accordance with claim 1 wherein said alcohol is sorbitol.

9. A process for preparing halogen-containing polyether epoxide composition which comprises
 (A) reacting
  (1) aliphatic polyhydric alcohol having 3 to 6 hydroxyl groups and at least 3 carbon atoms with
  (2) alkylene oxide containing from 3 to 4 carbon atoms, inclusive, and having an alkyl group attached to a carbon atom of the oxirane ring, said alkyl group having a maximum of 2 carbon atoms and containing at least 2 halogen atoms bonded to the terminal carbon atom, said halogen atoms bonded to the terminal carbon atom being the only halogen atoms in the compound, and
  (3) epihalohydrin, and
 (B) reacting the reaction product of (1), (2), and (3) in the presence of an alkaline material to produce an epoxide composition.

10. The process of claim 9 wherein the alcohol (1) and alkylene oxide (2) are reacted together at a temperature of from about $-10°$ C. to 200° C. and the reaction product then reacted with the epihalohydrin (3) at a temperature of from about $-10°$C. to 200° C. and the reaction product of (1), (2), and (3) reacted in the presence of an alkaline material to produce an epoxide composition at a temperature of $-10°$ C. to $+50°$ C.

11. The process of claim 10 wherein the reaction between the epihalohydrin (3) and the reaction product of the alcohol (1) and alkylene oxide (2) is performed in the presence of a Friedel-Crafts catalyst in an amount from about 0.001 to 5% by weight and the amount of alkaline material employed in step (B) is sufficient to produce an OH/chlorohydrin (Cl$^-$) mole ratio from 0.5 to 2.

12. The process of claim 11 wherein said catalyst is tin tetrachloride.

13. The process of claim 11 wherein said catalyst is a boron trifluoride catalyst.

14. The process of claim 10 wherein a Friedel-Crafts catalyst is employed for the reaction of said alcohol (1) with said alkylene oxide (2) in an amount from about 0 to 5% by weight of the total reactants and the amount of alkaline material employed in step (B) is sufficient to produce an OH/chlorohydrin (Cl$^-$) mole ratio from 0.5 to 2.

15. The process of claim 14 wherein said catalyst is a boron trifluoride catalyst.

16. The process of claim 14 wherein said catalyst is tin tetrachloride.

References Cited

UNITED STATES PATENTS

| | | | |
|---|---|---|---|
| 3,305,565 | 2/1967 | Mueller | 260—348.6 |
| 3,033,803 | 5/1962 | Price et al. | |
| 3,318,960 | 5/1967 | Earing. | |
| 3,359,217 | 12/1967 | Brandner. | |
| 3,117,138 | 1/1964 | Price | 260—348.6 |

WILLIAM H. SHORT, Primary Examiner

T. PERTILLA, Assistant Examiner

US. Cl. X.R.

161—184; 117—161; 260—40, 9, 37, 348.6, 830, 348